(12) United States Patent
Takahashi

(10) Patent No.: US 8,736,913 B2
(45) Date of Patent: May 27, 2014

(54) IMAGE PROCESSING APPARATUS, CONTROL METHOD THEREFOR AND PROGRAM FOR DIVIDING INSTRUCTIONS OF A SCAN JOB INTO SEPARATE CHANGEABLE AND UNCHANGEABLE SCAN JOB TICKETS

(75) Inventor: Yasuhiro Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 624 days.

(21) Appl. No.: 12/973,805

(22) Filed: Dec. 20, 2010

(65) Prior Publication Data

US 2011/0157657 A1 Jun. 30, 2011

(30) Foreign Application Priority Data

Dec. 25, 2009 (JP) ................................ 2009-295441

(51) Int. Cl.
*H04N 1/387* (2006.01)
*H04N 1/00* (2006.01)
*H04N 1/46* (2006.01)
*G06K 9/34* (2006.01)

(52) U.S. Cl.
USPC ........................... 358/453; 358/538; 382/175

(58) Field of Classification Search
None
See application file for complete search history.

(56) References Cited

U.S. PATENT DOCUMENTS

| 4,571,699 | A | * | 2/1986 | Herzog et al. | 358/408 |
| 5,249,240 | A | * | 9/1993 | Nakayama | 382/159 |
| 5,991,469 | A | * | 11/1999 | Johnson et al. | 382/317 |
| 6,727,999 | B1 | * | 4/2004 | Takahashi | 358/1.15 |
| 7,289,685 | B1 | * | 10/2007 | Wolff et al. | 382/317 |
| 2007/0154098 | A1 | * | 7/2007 | Geva et al. | 382/209 |
| 2007/0228168 | A1 | * | 10/2007 | Suzuki et al. | 235/454 |
| 2007/0242882 | A1 | * | 10/2007 | Chiba et al. | 382/173 |
| 2008/0068638 | A1 | * | 3/2008 | Yagi | 358/1.14 |
| 2008/0187221 | A1 | * | 8/2008 | Konno et al. | 382/175 |
| 2009/0207446 | A1 | * | 8/2009 | Akashi | 358/1.15 |

FOREIGN PATENT DOCUMENTS

| JP | 2008-145611 | * | 6/2008 | G09B 19/00 |
| JP | 2008-145611 A | | 6/2008 | |

* cited by examiner

*Primary Examiner* — Vincent Rudolph
*Assistant Examiner* — Peter L Cheng
(74) *Attorney, Agent, or Firm* — Carter, DeLuca, Farrell & Schmidt, LLP

(57) ABSTRACT

An image processing apparatus which reads a first ticket and a second ticket and performs processing extracted from information on the tickets includes a ticket generation unit configured to extract, from a processing instruction sheet serving as an original document which describes a processing target region in a processing target original document, information regarding the processing target region in order to generate a ticket, and to generate a ticket's contents of processing to be performed on the processing target region in a format. The ticket generation unit further extracts information regarding contents of processing instructed to be performed on a region in which a change in contents of processing instructed by the processing instruction sheet to be performed thereon is permitted, and generates a second ticket.

9 Claims, 14 Drawing Sheets

FIG. 8

CONFIRM CONTENTS OF CHECK

DETERMINE DATE TO CHECK

DEFAULT

DATE DESIGNATION — 0802

PERIOD DESIGNATION — 0807

---/--/--- — 0804

FROM 2009/01/01 — 0805
TO 2009/04/30 — 0806

DIVISION IS [APPLIED] [NOT APPLIED] CHANGE IS [PERMITTED] [FORBIDDEN]

CONFIRM CONTENTS OF CHECK

DETERMINE TYPE OF SEAL TO CHECK

DEFAULT

SEAL DESIGNATION

REGISTERED SEAL LIST — 0903

0904 DEPARTMENT   0905 SECTION   0912 SUBSECTION

NEWLY REGISTER

DIVISION IS APPLIED | NOT APPLIED        CHANGE IS  0909 PERMITTED  0910 FORBIDDEN

OK — 0911

IMAGE PROCESSING APPARATUS, CONTROL METHOD THEREFOR AND PROGRAM FOR DIVIDING INSTRUCTIONS OF A SCAN JOB INTO SEPARATE CHANGEABLE AND UNCHANGEABLE SCAN JOB TICKETS

BACKGROUND OF THE INVENTION

1. Field of the Invention

The present invention relates to an image processing apparatus for extracting additional information added to an original document and performing processing according to a result of extracting the additional information, a control method therefor, and a program therefor.

2. Description of the Related Art

Conventionally, a technique for reading an original document, such as a form, with a scanner, and extracting information, such as a money amount and a date, described on the original document has been known. Using the technique enables utilization of pieces of data extracted from a large number of forms in processing such as aggregation. However, in order to automatically perform the processing such as aggregation with a scanner, it is necessary to recognize what type of data exists in a form and at what position in the form the data exists.

Japanese Patent Application Laid-Open No. 2008-145611 discusses the following method. More specifically, first, processing instruction information representing a region to be subjected to processing and contents of the processing to be performed thereon is written by hand in an original document to be processed. Then, the written processing instruction information is read with a scanner. Thus, a processing instruction sheet specifying the region to be processed and the contents of the processing is generated.

However, if the method discussed in Japanese Patent Application Laid-Open No. 2008-145611 is used, when the contents of the processing written in the processing instruction sheet once generated are partly changed, it is necessary that all of desired processing instruction information is written again in an original document to be processed, and that the processing instruction sheet is regenerated from the beginning. Thus, when only a part of the processing instruction sheet already generated is changed, a method of generating a processing instruction sheet in consideration of user's convenience is needed.

SUMMARY OF THE INVENTION

The present invention is directed to a technique of preliminarily generating, when performing processing according to a result of extracting additional information added to an original document of a processing instruction sheet, another processing instruction sheet to perform processing whose contents are changeable, to facilitate change of the contents of the processing.

According to an aspect of the present invention, an image processing apparatus which reads a first ticket and a second ticket and performs processing extracted from information added to the tickets includes a ticket generation unit configured to extract, from a processing instruction sheet serving as an original document which describes a processing target region in a processing target original document, information regarding the processing target region in order to generate a ticket, and to generate a ticket to which an image obtained by encoding the extracted information and contents of processing to be performed on the processing target region in a format recognizable by the image processing apparatus is added. The ticket generation unit extracts information regarding contents of processing instructed to be performed on a region in which a change in contents of processing instructed by the processing instruction sheet to be performed thereon is not permitted, and generates the first ticket to which the image obtained by encoding the extracted information in the format recognizable by the image processing apparatus is added. The ticket generation unit further extracts information regarding contents of processing instructed to be performed on a region in which a change in contents of processing instructed by the processing instruction sheet to be performed thereon is permitted, and generates a second ticket to which the image obtained by encoding the extracted information in the format recognizable by the image processing apparatus is added.

According to the present invention, additional information added to the original document can be extracted. When processing is performed according to a result of extracting the additional information, a processing instruction sheet having no possibility in change thereof and another processing instruction sheet having possibility in change thereof are generated separately from each other. Accordingly, the contents of the processing can easily be changed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an example of a screen for changing the setting of the date check.

FIG. 9 illustrates an example of a screen for changing the setting of the seal check.

DESCRIPTION OF THE EMBODIMENTS

Various exemplary embodiments, features, and aspects of the invention will be described in detail below with reference to the drawings.

Figure 1:
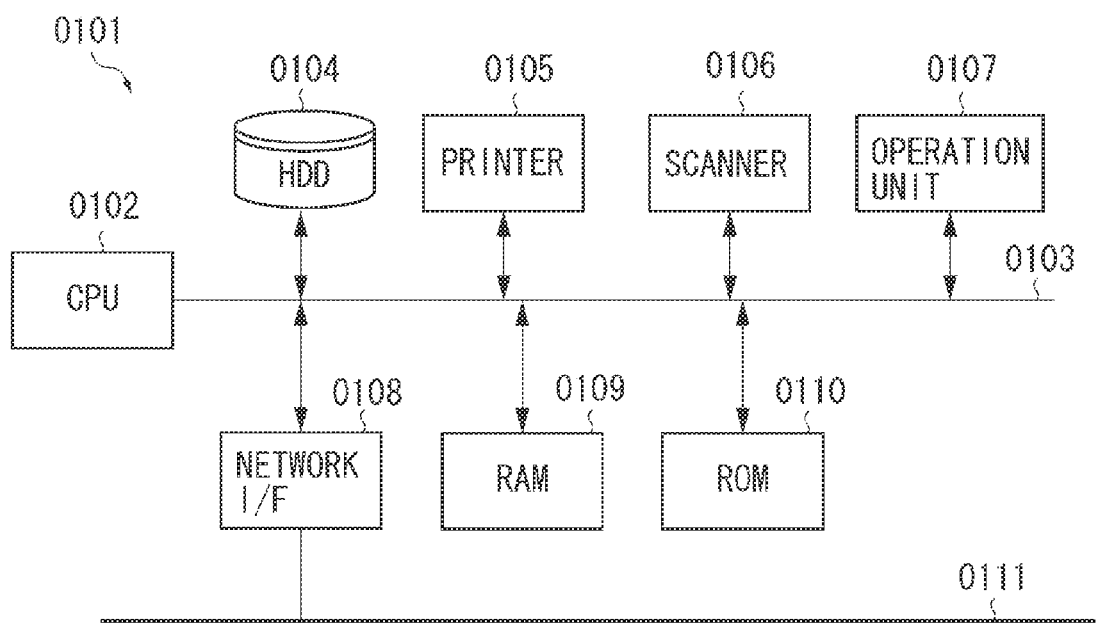
FIG. 1 is a block diagram illustrating a configuration of an image processing apparatus.

FIG. 1 is a block diagram illustrating a configuration of an image processing apparatus that is an example of an exemplary embodiment of the present invention. FIG. 1 illustrates a multifunctional peripheral with various functions, e.g., a copy function and a scanner function as an example of an image forming apparatus 0101 according to the present exemplary embodiment. Such functions can be implemented by coordinating a plurality of apparatuses with one another.

A central processing unit (CPU) 0102 controls an operation of the entire image processing apparatus 0101 by loading a program stored in a read-only memory (ROM) 0110 to a random access memory (RAM) 0109. The CPU 0102 communicates with each component of the image processing apparatus 0101 via a bus 0103. An operation unit 0107 includes a plurality of keys for a user to input an instruction and a display unit that displays various pieces of information to be notified to a user.

A scanner 0106 serving as a reading device reads an image formed on an original document set on a platen by a user as a color image. Thus, obtained electronic data (image data) is stored in a hard disk drive (HDD) 0104, the RAM 0109, and the like. The HDD 0104 contains a hard disk and stores various pieces of input information. The scanner 0106 includes an original document feeder and can sequentially feed onto the platen a plurality of sheets of original documents set in the original document feeder and read the set original document.

A printer 0105 serving as a printing device prints on recording paper (sheet) an image based on input image data. A network interface (I/F) 0108 connects the image processing apparatus 0101 and a network 0111 and controls reception of data from an external apparatus on the network and transmission of data to the external apparatus on the network.

In the following description of the present exemplary embodiment, an image processing apparatus to which image data to be used in a process to be described below is input via the scanner 0106 is exemplified. Further, the image processing apparatus can similarly process image data representing an image of an original document, which is sent from an external device and input thereto via the network I/F 0108. Alternatively, such input image data can similarly be processed in a personal computer (PC) to which a scanner and a printer are connected. In this case, all or a part of programs used in the present exemplary embodiment can be provided to a PC via a network. Alternatively, all or a part of programs used in the present exemplary embodiment can be provided to a PC by being stored in a storage medium such as a compact disc ROM (CD-ROM).

Figure 2:
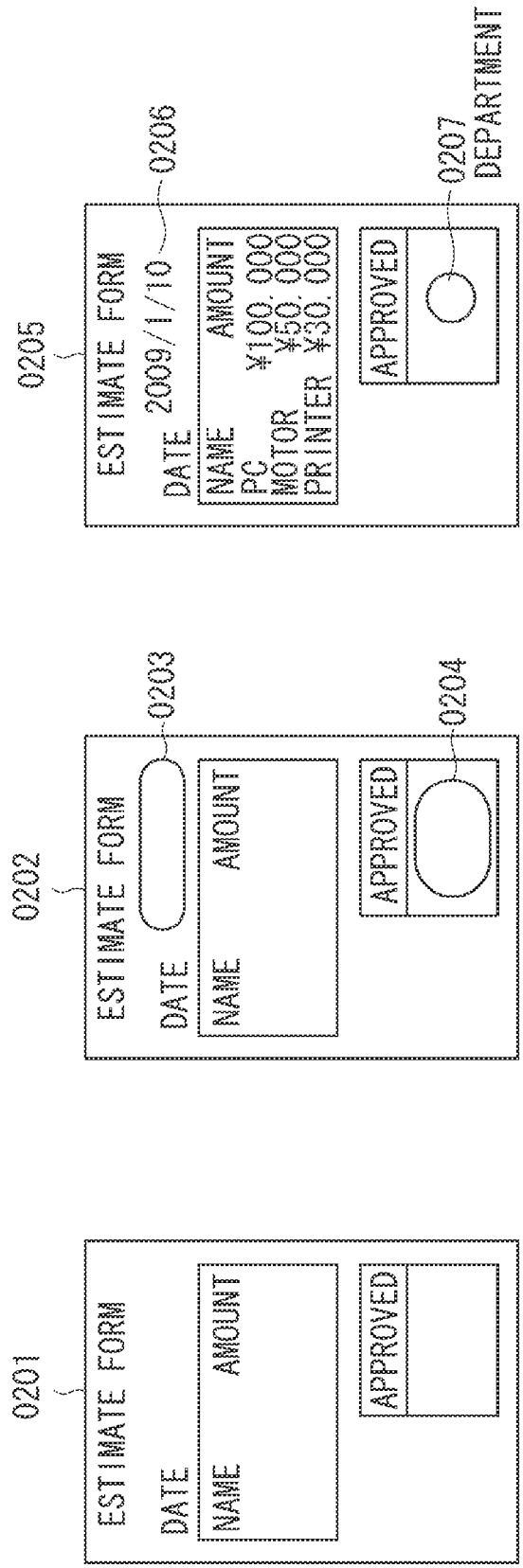
FIG. 2 illustrates examples of an original document to be processed.

Next, an example of an original document used in the present exemplary embodiment is described below. FIG. 2 illustrates an example of an original document used in the present exemplary embodiment. An original document (form original) 0201 is an estimate in a state in which a user enters nothing (before processing instruction information to be described below is added thereto). The estimate is provided with regions on which a date, an article name, and a money amount are entered and a seal is put. When the estimate is officially issued, a user describes contents of such data in the regions, respectively.

According to the present exemplary embodiment, it is assumed to check whether a correct date is written to a date field filled by a user among fields of the estimate, and whether a correct seal is put on a region onto which the seal should be put.

An original document 0202 is an example in which items are added using a color pen by a user to each arbitrary target region corresponding to each item to be checked among items contained in the original document 0201. The original document 0202 serves as a processing instruction sheet.

The processing instruction sheet is generated by writing processing instruction information, which is described below, on a sheet of the same format as that of an estimate serving as a processing target original document by a user who will check the generated estimate. More specifically, in order to designate a region as the processing target in the original document 0201, a user uses a color pen or the like to surround the region as a closed area with a graphic such as a rectangle. The original document 0202 having the surrounded region is used as the processing instruction sheet.

The processing instruction information to be written to an estimate (form original), i.e., the original document 0201 is described below. In the original document 0202, e.g., a region 0203 is assumed to be a region surrounded with a blue pen. Another region 0204 is assumed to be a region surrounded with a red pen. Any color other than the above colors can be used. The number of the colors is not limited to two. The types of the colors can be reduced or increased according to the contents of checks. In this case, a user uses color pens. However, as long as a color can be given to a graphic, a coloring tool is not limited to color pens.

Then, the user preliminarily associates color information corresponding to each type of the processing instruction information with a content of processing and registers the color information and the contents of processing in the RAM 0109 via the operation unit 0107. Processing corresponding to the color of the color pen is performed on the closed area surrounded by the color pen. More specifically, it is registered in the RAM 0109 that a region surrounded by a blue pen is subjected to checking whether a correct date is entered therein, and that a region surrounded by a red pen is subjected to checking whether a correct seal is put thereon.

A registration procedure is described below with reference to FIGS. 3 through 5.

An original document 0205 is an example of an original document as a check target, i.e., an original document to be processed which is used in the present exemplary embodiment. It is assumed that the original document as the check target is based on the original document of the same format as that of the original documents 0201 and 0202. According to the present exemplary embodiment, it is instructed in the processing instruction sheet 0202 to check whether a correct date is written in the region 0203 and whether a correct seal is put on the region 0204. Thus, a date 0206 written in and a seal 0207 put on the original document 0205 as the check target are checked. The contents and the regions to be checked are not limited the above described items. Checking of other contents and other regions can be instructed.

Figure 3:
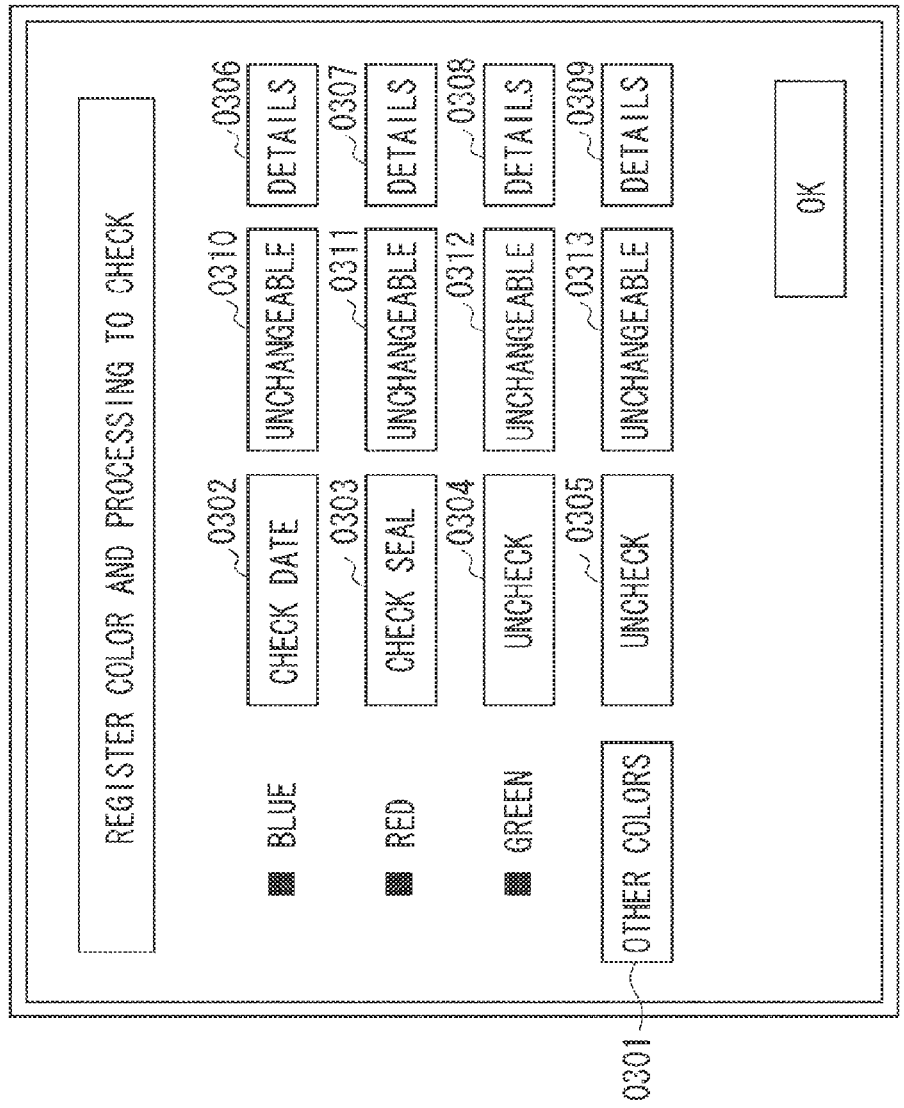
FIG. 3 illustrates an example of a screen for registering color information and information representing contents of processing which are included in processing instruction information.

The registration of the information concerning the color and the contents of processing which are included in the processing instruction information is performed using a registration screen illustrated in FIG. 3. It is assumed that the registration screen illustrated in FIG. 3 is displayed in the operation unit 0107, and a user performs the registration from this screen. According to the present exemplary embodiment, when checking corresponding to a blue-color whether a correct date is entered, a user selects a check content setting button 0302 corresponding to the blue-color and registers what to check in the registration screen. When the user pushes down the content setting button 0302, the user can select one of the contents of processing "CHECK DATE", "CHECK SEAL", and "UNCHECK" from a pull-down menu. The button 0302 indicates that the processing "CHECK DATE" is selected.

Similarly, another check content setting button 0303 corresponding to a red-color indicates that the processing "CHECK SEAL" is selected. Another check content setting button 0304 indicates that "UNCHECK" is selected in the current processing instruction sheet 0202 as the contents of the check instructed with an unused green pen. When an instruction corresponding to a color pen other than the blue pen, the red pen and the green pen is set, an "OTHER COLORS" selection button 0301 is pushed down to determine a color. Then, similarly, contents of a check corresponding to the determined color can be designated with a check content setting button 0305.

Each of processing content change permission/rejection setting buttons 0310 to 0313 is used to set whether the contents of processing can be changed when a scan ticket generated in a manner as will be described below is read with the scanner 0106. Usually, the contents of the check are not changed. Thus, the condition "UNCHANGEABLE" is set as a default value. Every time when each of the buttons 0310 to 0313 is pushed down, the set value is alternately switched between the conditions "UNCHANGEABLE" and "CHANGEABLE".

Next, a method for setting the contents of a check in detail is described below with reference to FIGS. 4 and 5. FIG. 4 illustrates an example of a screen displayed in the operation unit 0107 when the check type "CHECK DATE" is selected by each of the check content setting buttons 0302 through 0305 respectively corresponding to the colors of the pens as in FIG. 3, and an associated one of details setting buttons 0306 through 0309 is pushed down. (Because the check type "CHECK DATE" is selected by the button 0302 illustrated in FIG. 3, the screen in FIG. 4 is displayed when the details setting button 0306 is pushed down).

Figure 4:
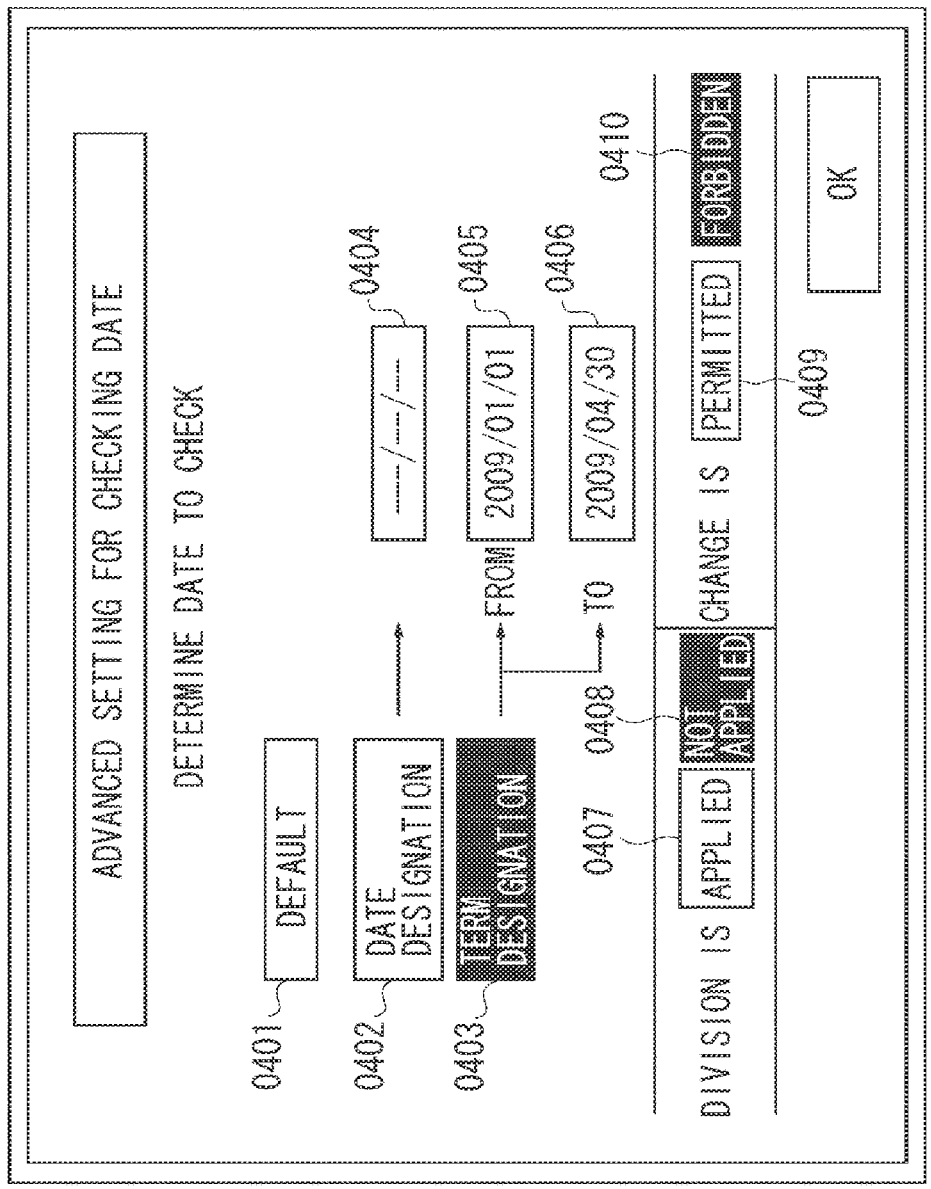
FIG. 4 illustrates an example of a screen for details setting of a date check.

When the user selects "CHECK DATE", the details of the date to be checked can be set in the screen illustrated in FIG. 4. When the user selects a default setting button 0401 illustrated in FIG. 4, if a date up to the current date of the check is described in the original document, it is determined that a correct date is entered. When the user selects a date designation button 0402, a date to be designated is entered into an entry field 0404 from the operation unit 0107.

When the user selects a term designation button 0403, data representing a start and an end of a term are entered into the fields 0405 and 0406, respectively. Consequently, it is determined what should be described to be determined as a correct date in checking the date. In this case, it is assumed that the user selects the term designation button 0403, and that the term is set to start from Jan. 1, 2009 and to end at Apr. 30, 2009.

Division setting buttons 0407 and 0408 are used to designate how to generate a scan ticket (to be described below) when the scan ticket is generated. In this case, it is assumed that the user chooses that division is "NOT APPLIED".

Change permission setting buttons 0409 and 0410 are used to set, when the generated scan ticket (to be described below) is read with the scanner 0106, whether the set contents can be changed. In this case, it is assumed that a user chooses that change is "forbidden".

Figure 5:
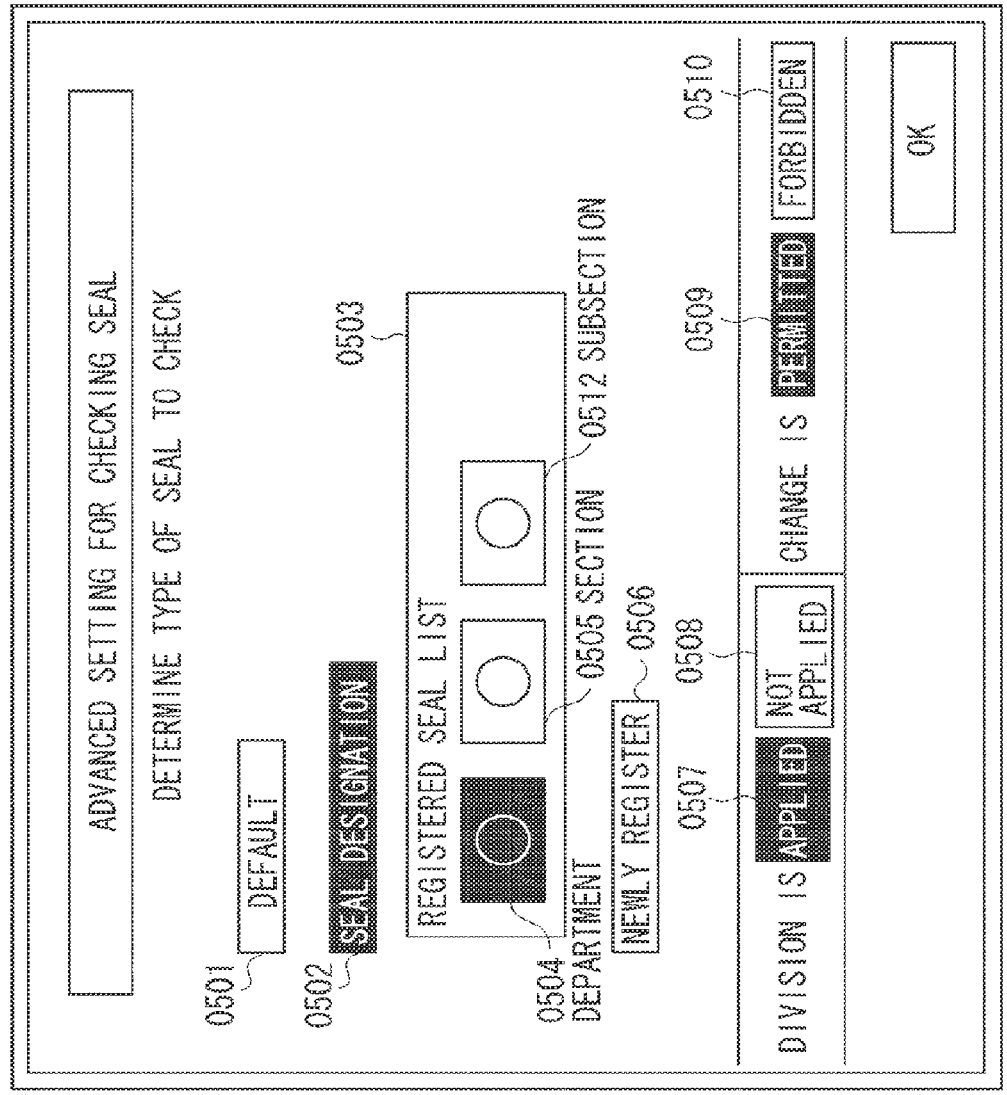
FIG. 5 illustrates an example of a screen for details setting of a seal check.

FIG. 5 illustrates an example of a screen displayed in the operation unit 0107 when a user selects "CHECK SEAL" in each of the check content setting buttons 0302 through 0305 corresponding to the color of each pen illustrated in FIG. 3, and pushes down an associated one of the details setting buttons 0306 through 0309 for setting the details of the check. (In the example illustrated in FIG. 3, the check type "CHECK SEAL" is selected by the button 0303. Thus, the screen illustrated in FIG. 5 is displayed when the details setting button 0307 is pushed down.)

When a seal is checked, the user sets the contents of the check in detail from the screen illustrated in FIG. 5. If the user selects a default setting button 0501 in the screen illustrated in FIG. 5, it is assumed that a user checks only whether a seal is put on an original document. When the user selects a seal designation button 0502, the user determines, from a seal list 0503 preliminarily stored in the HDD 0104, which of seals is put on an original document to cause the user to determine that a correct seal is put thereon.

The seal list 0503 illustrates a state in which a department manager's seal 0504, a section chiefs seal 0505, and a sub-section head's seal 0512 are registered. The user selects one of the seals. If the user wishes to check a seal which is not included in the seal list 0503, the user can register the seal using a button 0506 for newly registering a seal. Registration of the seal is performed by reading with the scanner 0106 a sheet on which the seal to be registered is put, and storing read image data in the HDD 0104. For convenience of description, it is assumed that the user selects the seal designation button 0502 and that the department manager's seal 0504 is set.

Division setting buttons 0507 and 0508 are used to designate how to generate a scan ticket (to be described below) when the scan ticket is generated. In this case, it is assumed that the user chooses that the division is "applied" division.

Change permission setting buttons 0509 and 0510 are used to set, when the generated scan ticket (to be described below) is read with the scanner 0106, whether the set contents of the check can be changed. In this case, it is assumed that the user chooses that the change is "permitted".

The above settings are stored in the RAM 0109 as setting information as follows.

Setting Information
1. Blue-Color
   Contents of Check
Date Check
Unchangeable
   Details Setting
Term Designation: 2009/01/01-2009/04/30
Division is not applied
Change is forbidden
2. Red-Color
   Contents of Check
Seal Check
Unchangeable
   Details Setting
Seal Designation Department Manger's Seal
Division is Applied
Change is permitted
3. Green-Color
   Unchecked
4. Other Colors
   Unchecked Next, a process of generating a scan ticket for checking, based on the processing instruction sheet 0202 illustrated in FIG. 2, contents described in an original document is described below. The scan ticket is a ticket that includes information which is obtained by recognizing contents of an instruction described in the processing instruction sheet 0202 and a method for checking an original document as a check target that is provided in a format (e.g., a quick response (QR) code) recognizable by the image processing apparatus 101. The scan ticket includes contents of an instruction recognized from the processing instruction sheet 0202 and position information about a position of a region to which the contents of the instruction is applied. When the original document as the check target is checked, the scan ticket is read with the scanner 0106. Then, the contents of processing are recognized by the CPU 0102, and the original document as the check target is checked.

Figure 6:
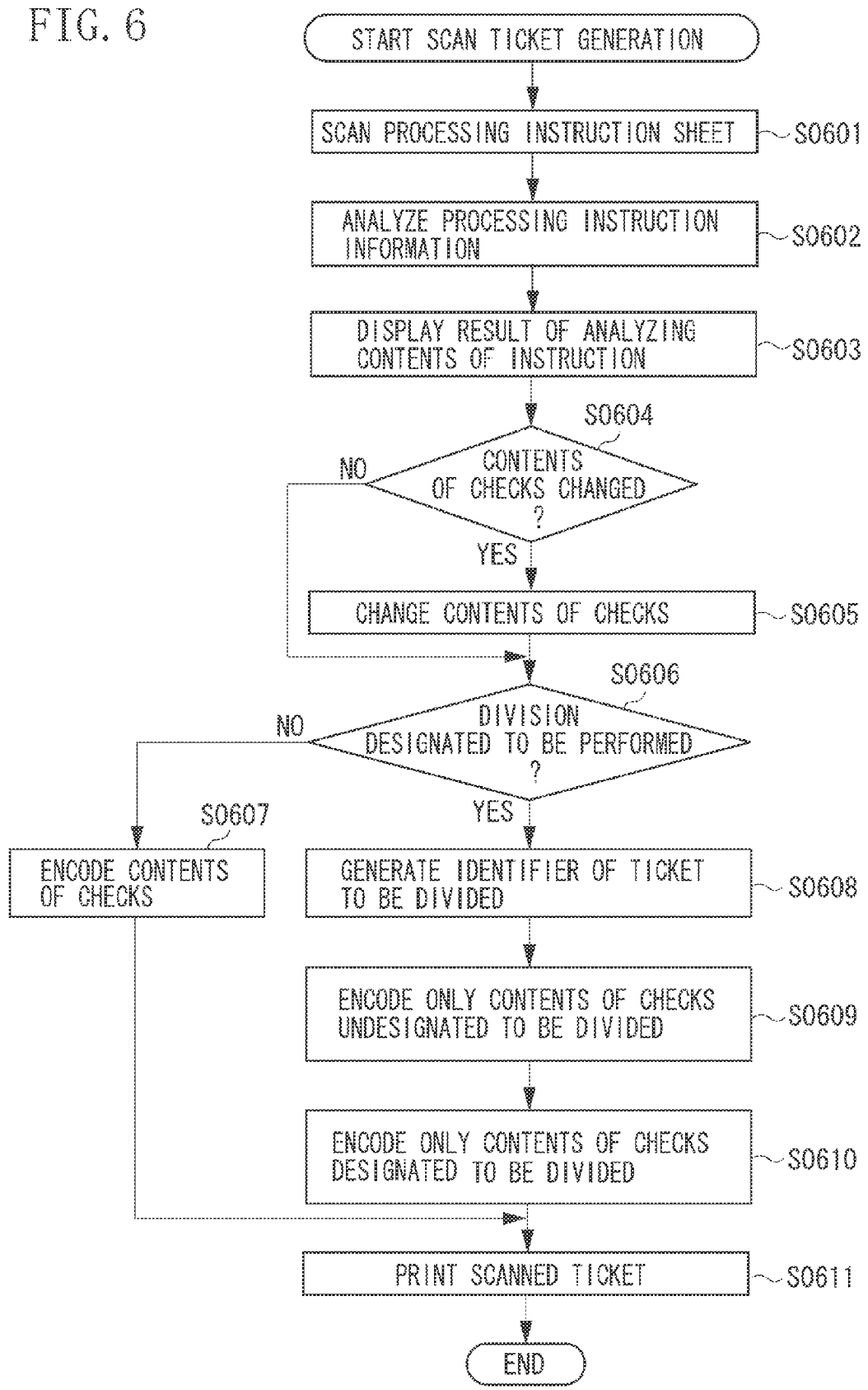
FIG. 6 is a flowchart illustrating a flow of processing of generating a scan ticket.

FIG. 6 is a flowchart illustrating a flow of processing to be performed when a scan ticket according to the present exemplary embodiment is generated. The flowchart illustrates a flow of processing of loading a program stored in the ROM 0110 into the RAM 0109 and executing the loaded program by the CPU 0102.

When an instruction to generate a scan ticket is issued by a user via the operation unit 0107, the processing in the present flow is started. In step S0601, the CPU 0102 causes the operation unit 0107 to display an indication prompting a user to set an original document on which instruction information has been described (corresponding to the processing instruction sheet 0202). When the user pushes down an OK button after setting the original document in response to the indication, the CPU 0102 causes the scanner 0106 to read the original document. Image data read by the scanner 0106 is stored in the RAM 0109.

Next, in step S0602, the CPU 0102 performs analysis and recognition processing of the processing instruction information from the image data input from the scanner 0106. Based on setting information preliminarily set, the CPU 0102 analyzes where an instruction color corresponding to the processing instruction information registered by the user is present in the original document. Further, the CPU 0102 recognizes a color of the portion, thus, a position of a processing target region corresponding to each color can be specified. The specified position can be used to determine that the position and a size of the processing target region in the original document. For example, the position thereof is specified by coordinates. Then, the specified position is associated with the contents of processing corresponding to the instruction color and stored in the RAM 0109 as analysis information.

Figure 7:
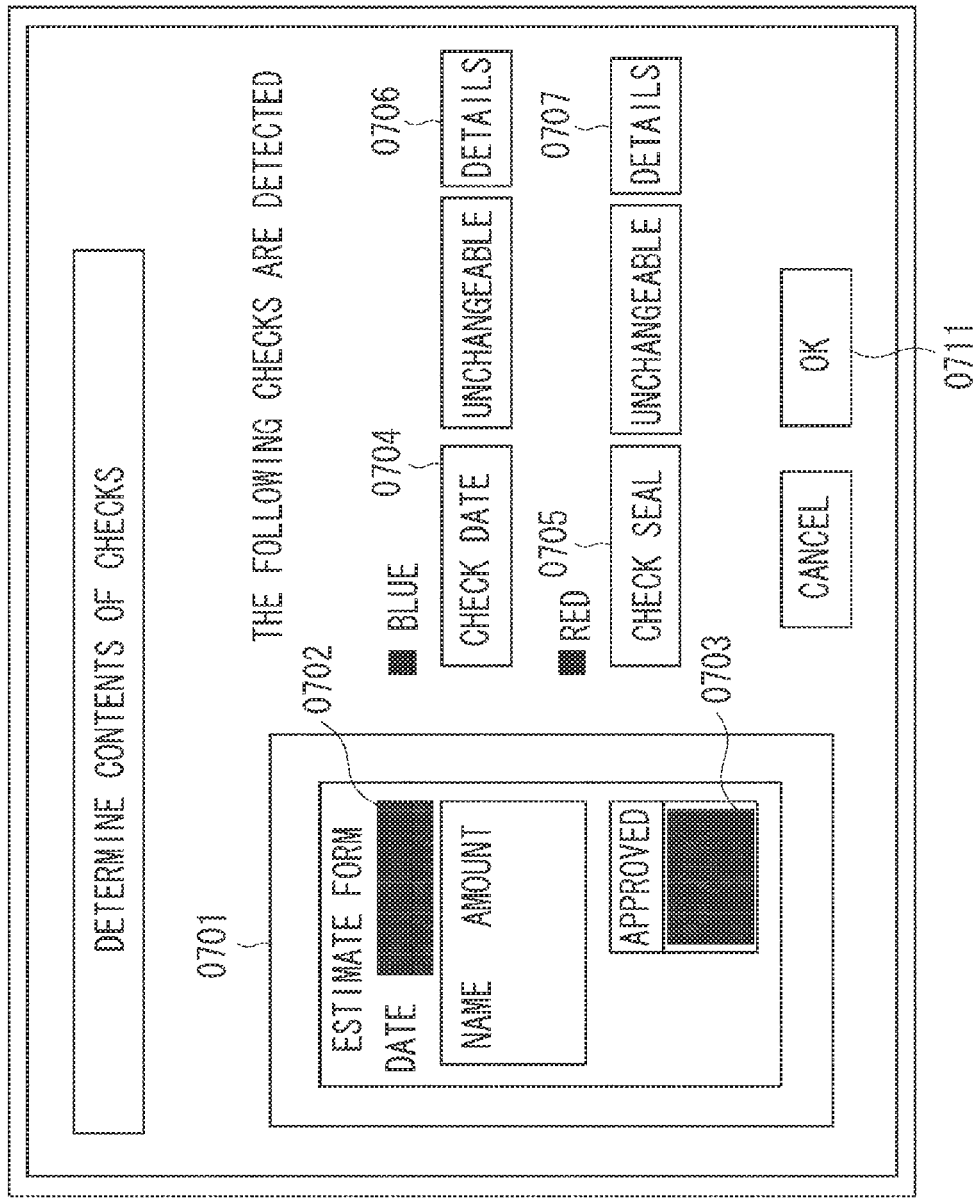
FIG. 7 illustrates a screen for changing contents of a check according to a result of analyzing a processing instruction sheet.

For example, the following analysis information is stored.
Analysis Information
Region 1
  Position
(2100, 1500)-(4400, 2000)
  Color
Blue
  Contents of Check
Date Check
Unchangeable
  Details Setting
Term Designation: 2009/01/01-2009/04/30
Division is not applied
Change is forbidden
Region 2
  Position
(3000, 5500)-(4000, 6500)
  Color
Red
  Contents of Check
Seal Check
Unchangeable
  Details Setting
Seal Designation Department Manger's Seal
Division is applied
Change is permitted Then, in step S0603, the CPU 0102 causes the operation unit 0107 to display a result of analysis and recognition performed in step S0602. FIG. 7 illustrates an example of such a display. As illustrated in FIG. 7, a thumbnail image 0701 of a read original document is displayed. In addition, a position at which the processing instruction information is indicated and the contents of processing indicated by the processing instruction information are displayed to be able to identify. A rectangular region 0702 filled in blue-color corresponds to the first region 0203 of the processing instruction sheet 0202 in which the user designates that the date is checked. A rectangular region 0703 filled in red-color corresponds to the second region 0204 of the processing instruction sheet 0202 in which the user designates that the seal is checked. The contents of processing corresponding to the regions 0702 and 0703 are displayed in fields 0704 and 0705, respectively.

In step S0604, the CPU 0102 waits for the user's determining whether the contents displayed in step S0603 are changed or not. The user checks the displayed thumbnail image 0701 whether each pieces of the information is correctly recognized at the position designated in the processing instruction sheet 0202. More specifically, the user confirms that the rectangular regions 0702 and 0703 recognized by the CPU 0102 correctly correspond to the regions 0203 and 0204 designated in the processing instruction sheet 0202, respectively.

Next, the user confirms the contents of the check. The content of the check associated with the rectangular region 0702 filled with blue-color corresponds to the region 0704. The contents of the details setting are confirmed by pushing down a details setting button 0706. When the user pushes down the details setting button 0706, the CPU 0102 causes the operation unit 0107 to display a screen of the detailed contents of the check, as illustrated in FIG. 8, based on the analysis information. The user confirms the contents of the check from the screen. If no change is added to the contents of the check, the user pushes an OK button 0811. If a change is added to the contents of the check (Yes in step S0604), in step S0605, the change of the contents is performed.

For example, according to the analysis information, a date is checked in the region 1 by designating a term (2009/01/01-2009/04/30). If the user wishes to change the term, a date is newly entered in fields 0805 and 0806. When a method for checking the date is changed to the date designation, the user pushes down a date designation button 0802, and enters from a field 0804 a date to designate. In this case, it is assumed that dates for the term designation are changed as follows.
Change 1
The term before change: 2009/01/01-2009/04/30
The term after change: 2009/01/01-2009/03/31
This change is reflected in the analysis information.

Similarly, the contents of the check corresponding to the rectangular region 0703 filled in red correspond to the field 0705. The user confirms the contents of the details setting thereof by pushing down a details setting button 0707. When the user pushes down the button 0707, the CPU 0102 causes the operation unit 0107 to display a screen illustrated in FIG. 9 of the details of the contents of the check, based on the analysis information. The user confirms from the screen the contents of the check. If no change is added to the contents of the check, the user pushes down an OK button 0911. If a change is added to the contents of the check, the user changes the contents of the check in this screen.

For example, according to the analysis information, the seal check is performed on the region 2 by designating a seal (a department manager's seal). If the user wishes to change the seal to designate, the user newly selects a seal from a list of registered seals, 0904, 0905, 0912 shown in a field 0903. In this case, it is assumed that an additional seal to designate is added to the registered seals so that a section chiefs seal can be permitted to be designated.
Change 2
Before the change: a department manager's seal
After the change: a department manager's seal+a section chief's seal
This change is reflected in the analysis information.
The analysis information is modified due to the above two changes as follows.
Analysis Information after Change
Region 1
  Position
(2100, 1500)-(4400, 2000)
  Color
blue
  Contents of Check
Date Check
Unchangeable
  Details Setting
Term Designation: 2009/01/01-2009/03/31
Division is not applied
Change is forbidden
Region 2
  Position
(3000, 5500)-(4000, 6500)
  Color
Red
  Contents of Check
Seal Check
Unchangeable
  Details Setting
Seal Designation Department Manger's Seal+Section Chief's Seal
Division is applied
Change is permitted The contents of the check can be changed using an item setting button 0704 or 0705 other than the above details setting buttons 0706 and 0707. For example, the item setting button 0704 is illustrated to correspond to the item "CHECK DATE". However, the item corresponding to the button 0704 can be changed to another setting item such as the item "UNCHECK" or "CHECK SEAL" by being pushed down. If the item is changed to "CHECK SEAL", a seal to check can further be determined by pushing down the associated details setting button 0706.

However, according to the present exemplary embodiment, the rectangular region 0702 designated with blue-color is a date column. Thus, the change in the contents of the setting to "CHECK SEAL" is meaningless. In this case, a possible change in the contents of the check is a change to the item "UNCHECK". Similarly, the item "CHECK SEAL" corresponding to the item setting button 0705 can be changed. The rectangular region 0703 designated with red-color is a seal column. Thus, the change in the contents of the setting to the item "CHECK DATE" is meaningless. In this case, a possible change in the contents of the check is a change to the item "UNCHECK".

Upon completion of confirmation concerning the contents of the check (No in step S0604), the user pushes down an OK button 0711. The processing proceeds to step S0606.

In step S0606, it is determined, based on the determined analysis information (the analysis information after change in this case, because the contents of the check is changed) whether there is the content of the check to which the division is designated. If the division is not designated (No in step S0606), the processing proceeds to step S0607. If the division is designated (Yes in step S0606), the processing proceeds to step S0608. In this case, according to the analysis information after change, the division is designated to be applied to the details setting of the instructed "SEAL CHECK". Thus, the processing proceeds to step S0608.

In step S0607, the CPU 0102 encodes the analysis information. When encoding the analysis information, the CPU 0102 encodes images of seals, such as the department manager's seal and the section chief's seal, stored in the HDD 0104 together with the thumbnail image 0701. However, encoding can be performed on paths to storage areas of the HDD 0104, which respectively store the seal images, instead of the seal images. The encoding of the analysis information is to encode the analysis information using, e.g., a two-dimensional code such as a QR code. Although the encoding of the analysis information using a two-dimensional code is described as an example in the present exemplary embodiment, the encoding thereof according to the present invention is not limited thereto. As long as the image processing apparatus 0101 can analyze and recognize a resultant-code, other encoding methods can be used.

On the other hand, in step S0608, the CPU 0102 generates an identifier to handle the content of the check to which division is designated to be applied thereto as another code. The identifier can be set to be a unique number in a system. In this case, character information "seal type" can be set as the identifier. Next, in step S0609, the CPU 0102 encodes the content of the check to which the division is not designated together with the above identifier generated in step S0608. In step S0610, the CPU 0102 encodes the content of the check to which the division is designated together with the above identifier generated in step S0608.

Finally, in step S0611, the CPU 0102 causes the printer 0105 to output and print encoded contents generated in step S0607 or encoded contents generated in steps S0609 and S0610 as an image on recording paper.

Figure 10:
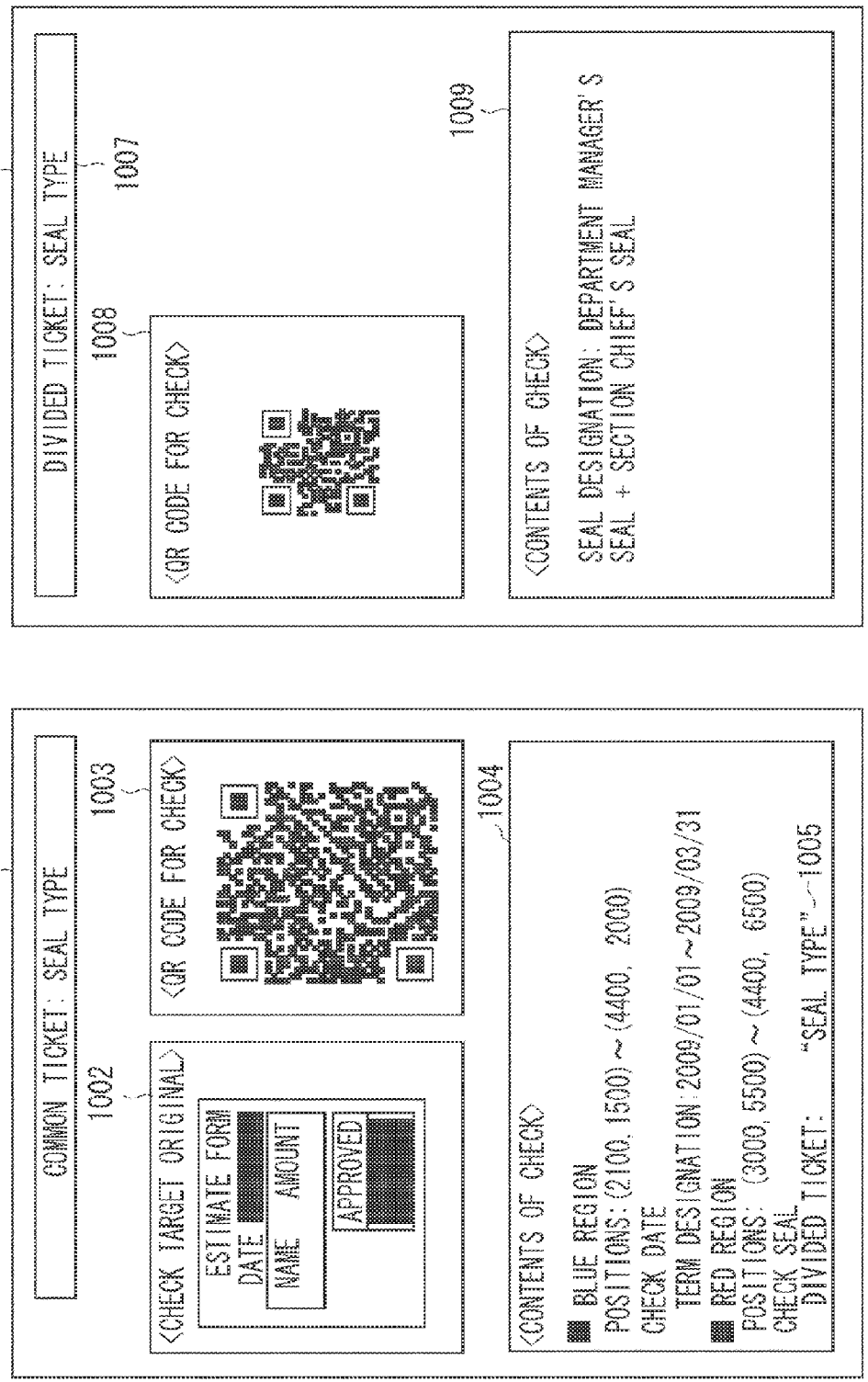
FIG. 10 illustrates an example of an output result of a scan ticket.

FIG. 10 illustrates examples of printed scan tickets. A first ticket (hereinafter referred to as a common ticket) 1001 corresponds to the content of the check 1004 to which division is not designated. Preferably, as illustrated in FIG. 10, an original document 1002 as a check target and the contents of the check are simultaneously printed on the common ticket 1001, in addition to a QR code 1003 generated in step S0609. An identifier 1005 is generated in step S0608 and designates a second ticket (hereinafter referred to as a divided ticket) corresponding to the content of the check 1004 to which division is designated. Accordingly, a divided ticket 1006 is generated. Preferably, an identifier 1007 and contents 1009 of the check of the divided ticket 1006 are simultaneously printed thereon in addition to a QR code 1008 generated in step S0610.

In this example, a single divided ticket is generated corresponding to a single common ticket. However, a plurality of divided tickets can be generated corresponding to a single common ticket. For example, if a division setting button 0807 is pushed down in the screen illustrated in FIG. 8 and the content of the date check is designated to be generated as a divided ticket, the contents of the date check can be generated as a divided ticket. More specifically, two divided tickets can be used corresponding to a single common ticket. Or, according to the present exemplary embodiment, a scan ticket that is conventionally generated as a single ticket can be generated as a plurality of scan tickets including a common ticket and one or more divided tickets by dividing the contents of the check. Thus, the contents of the check can be changed by replacing a scan ticket. A method for replacing a scan ticket is described below.

A procedure for checking an original document according to processing instruction information extracted using a scan ticket generated in the above manner is described below.

Figure 11:
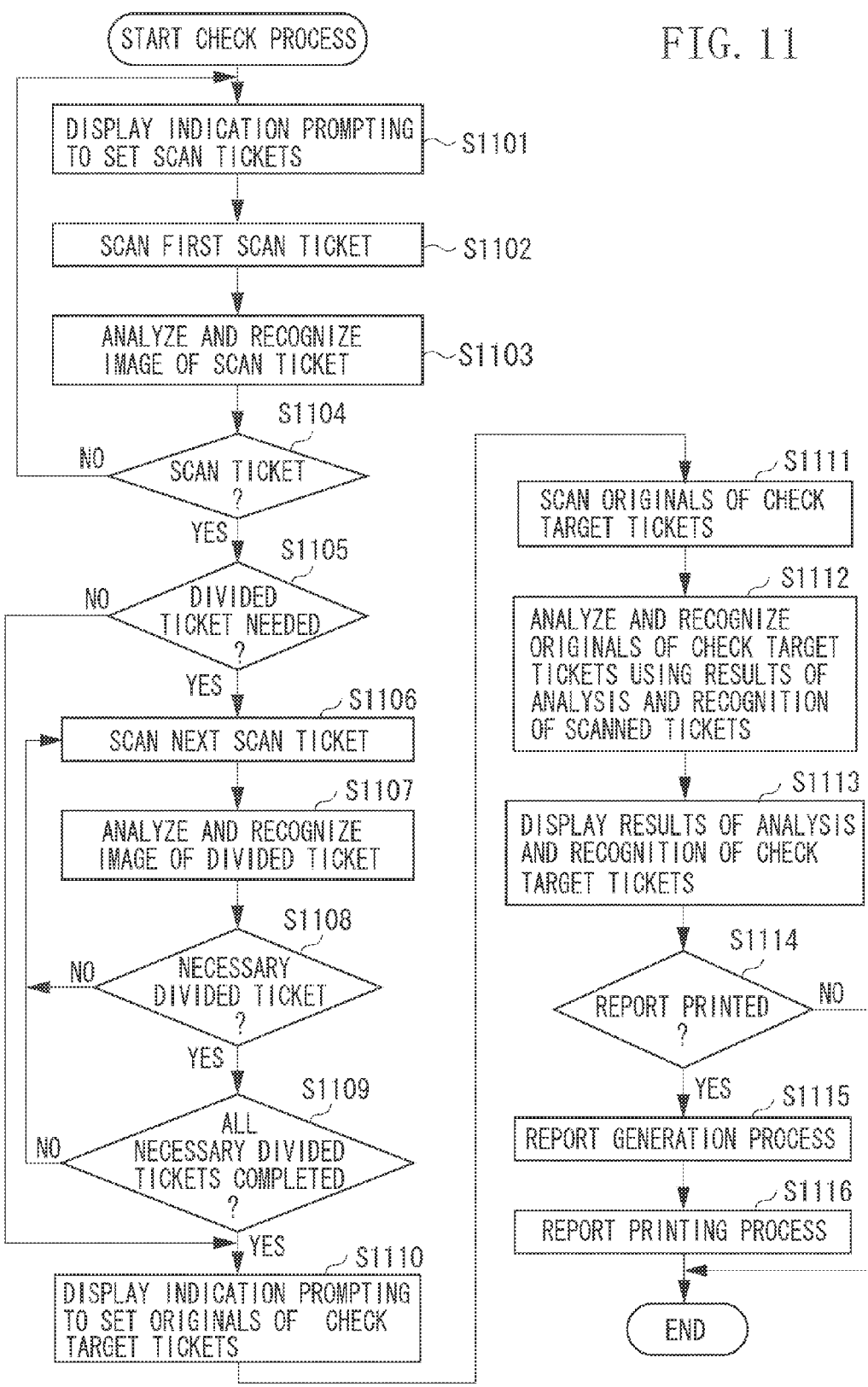
FIG. 11 is a flowchart illustrating a flow of processing of checking an original document using a scan ticket.

FIG. 11 is a flowchart illustrating a flow of processing of checking an original document as a check target using a scan ticket. The flowchart illustrates a flow of processing of loading a program stored in the ROM 0110 into the RAM 0109 and executing the loaded program by the CPU 0102.

When the user instructs the CPU 0102 via the operation unit 0107 to check an original document as a check target, the processing in the present flow is started. In step S1101, the CPU 0102 causes the operation unit 0107 to display an indication prompting the user to set the scan ticket printed in step S0611 in the original document feeder. When a divided ticket is used, the CPU 0102 instructs the user to set the common ticket as a first scan ticket and to set each divided ticket as a second or later scan ticket.

When reading of the original document is instructed by pushing the OK button of the operation unit 0107, the processing proceeds to step S1102 in which the CPU 0102 causes the original document feeder to feed the original document set therein. Then, the CPU 0102 causes the scanner 0106 to read the original document.

In step S1103, the CPU 0102 performs the analysis and recognition processing of an image of a first original document, i.e., the scan ticket read in step S1102. In this case, a two-dimensional code or the like of the read scan ticket is analyzed. Then, the CPU 0102 recognizes a region (position) and the contents of processing which are a target of the processing instruction, presence or absence of necessity for a divided ticket, and the like. If a divided ticket is necessary, the CPU 0102 recognizes an identifier of the necessary divided ticket. A result of the recognition is stored in the RAM 0109.

Next, in step S1104, it is determined from a result of the above recognition performed in step S1103 whether the original document scanned in step S1102 is a scan ticket. If the original document is not the scan ticket (No in step S1104), or if the original document is a scan ticket but a divided ticket (No in step S1104), the processing returns to step S1101.

If the scan ticket is correctly scanned (Yes in step S1104), the processing proceeds to step S1105 in which it is determined from a result of the recognition whether the necessity of the divided ticket exists. If no divided ticket is necessary (No in step S1105), the processing proceeds to step S1110. If a divided ticket is necessary (Yes in step S1105), the processing proceeds to step S1106 in which the next original document is scanned.

In step S1107, the CPU 0102 performs the analysis and recognition processing of an image of the original document read in step S1106, i.e., a divided ticket. In this case, the two-dimensional code or the like of the read divided ticket is analyzed. In addition, the identifier of the divided ticket and the contents of processing are recognized. A result of the recognition is stored in the RAM 0109.

In step S1108, the CPU 0102 collates the identifier recognized in step S1107 with that of the necessary divided ticket recognized in step S1103. If the ticket recognized in step S1107 is an unnecessary divided ticket (or is not a divided ticket) (No in step S1108), the processing returns to step S1106 in which the next original document is scanned again.

On the other hand, if the ticket recognized in step S1107 is a necessary divided ticket (Yes in step S1108), the processing proceeds to step S1109 in which it is determined whether there is another necessary divided ticket. If all divided tickets are not completed (No in step S1109), the processing returns to step S1106. If all divided tickets are completed (Yes in step S1109), the processing proceeds to step S1110.

In step S1110, the CPU 0102 causes the operation unit 0107 to display an indication prompting the user to set the original document as the check target. When the reading of the original document is instructed after the original document is set and the OK button of the operation unit 0107 is pushed down, the processing proceeds to step S1111 in which the original document as the check target is scanned.

Next, in step S1112, the CPU 0102 analyzes and recognizes the original document as the check target using a result of the recognition which is stored in the RAM 0109. For example, in the original document 0205 as the check target, the CPU 0102 recognizes that a date within the range "2009/01/01-2009/03/31" is entered in the date column 0206 and the seal 0207 is "the department manager's seal or the section chief's seal".

In the recognition in this step, e.g., optical character recognition (OCR) processing is performed on the image of the date column 0206. Then, it is checked whether a date included within the range "2009/01/01-2009/03/31" is entered in the date column 0206. In addition, it is determined by pattern recognition processing whether the seal 0207 is matched with the image of "the department manager's seal or the section chief's seal". The above recognition processing is an example. Other recognition methods can be employed.

Then, the CPU 0102 sequentially accumulates page numbers of pages of the original documents as the check targets and results of recognition of the pages in the RAM 18. In this case, it is assumed that if results of all items of recognition of a single page of the original document as the check target are normal, the original document as the check target is determined to be "OK", and if at least one of results of all items of recognition thereof is not recognized to be normal, the original document as the check target is determined to be "no-good (NG)". Upon completion of the recognition processing of all of the original documents to be checked, the CPU 0102 performs aggregation of the results of the recognition of all original documents stored in the RAM 0109.

The aggregation of the results includes to calculate a total number of pages of the original documents that have been checked, the numbers of regions determined to be "NG", the page numbers of pages of the original documents each including the region determined to be "NG", or the like. Amounts of information of the type other than the above described information can be aggregated, as long as the information can be identified from the information accumulated in the RAM 0109. Although it has been described that such information is stored in the RAM 0109, the same processing can be performed if such information is stored in the HDD 0104.

Then, in step S1113, the CPU 0102 causes the operation unit 0107 to display results of the aggregation performed in step S1112. The operation unit 0107 displays the results of the aggregation, such as a total number of checked original documents, and, if there are original documents determined to be "NG", a total number of regions determined to be "NG", and page numbers of the original documents determined to be "NG". The CPU 0102 can cause the operation unit 0107 to display a button for instructing to print a report, simultaneously with the results of the aggregation, to output onto the recording paper a report representing the result of the aggregation.

If it is determined that the above described button for instructing to print a report is pushed (Yes in step S1114), the processing proceeds to step S1115 in which the CPU 0102 generates a report representing the result of the aggregation.

The printing of the result onto the recording paper by the printer 0105 can utilize a wide region, as compared with the displaying of the result in the operation unit 0107. Accordingly, it is useful to add a large amount of information to the report, as compared with the display in step S1113. For example, a reduced image of an original document template as the check target can simultaneously be put on the recording paper, in addition to the result of the aggregation.

In step S1116, the CPU 0102 causes the printer 0105 to output the generated report as image data and to print the image data on the recording paper. At that time, simultaneously with the report, a page determined to be "NG" can be printed by adding thereto information indicating that the page is "NG".

In step S1105, if it is determined that a divided ticket is necessary (Yes in step S1105), the processing doesn't shift to a process of scanning a checked original document until the reading of necessary divided tickets is completed. However, if divided tickets to be read are insufficient, the contents of the check to be designated by divided tickets can be set by the user from the operation unit 0107.

Next, a method for newly generating a third ticket serving as another scan ticket from an already generated scan ticket by changing contents thereof is described. For convenience of description, it is assumed that a regenerated scan ticket is a divided ticket, the example 1006 of which is illustrated in FIG. 10.

Figure 12:
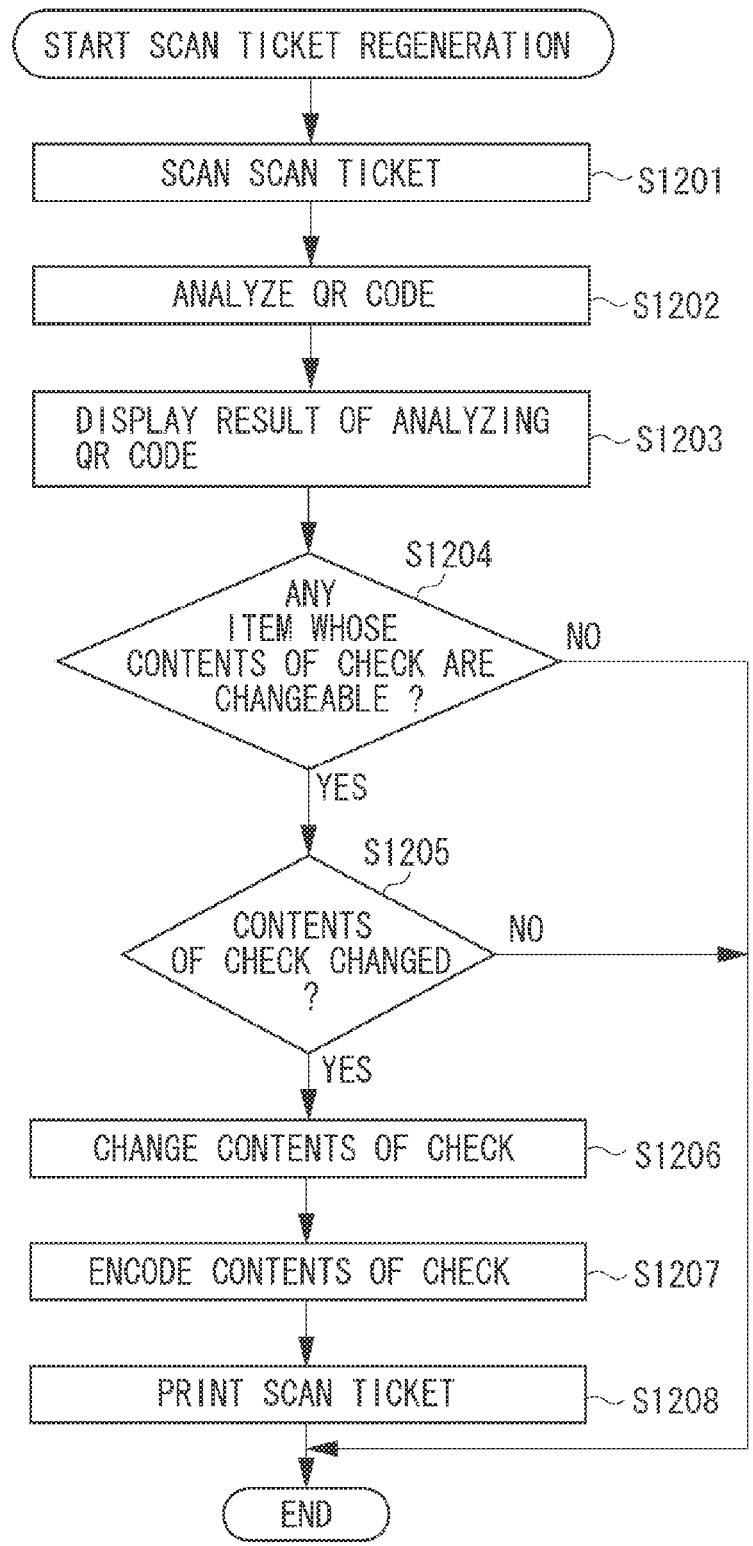
FIG. 12 is a flowchart illustrating a flow of processing of regenerating a scan ticket.

FIG. 12 is a flowchart illustrating a flow of processing of regenerating a scan ticket according to the present exemplary embodiment. The flowchart illustrates a flow of processing of loading a program stored in the ROM 0110 into the RAM 0109 and executing the loaded program by the CPU 0102.

When an instruction to regenerate a scan ticket is issued by a user via the operation unit 0107, the processing in the present flow is started. In step S1201, the CPU 0102 causes the operation unit 0107 to display an indication prompting the user to set a scan ticket (corresponding to the common ticket 1001 or the divided ticket 1006). When the OK button is pushed after the user sets the scan ticket in response to the indication (for convenience of description, it is assumed that the divided ticket 1006 is set by the user), the scanner 0106 reads the original document. Image data read by the scanner 0106 is stored in the RAM 0109.

Figure 13:
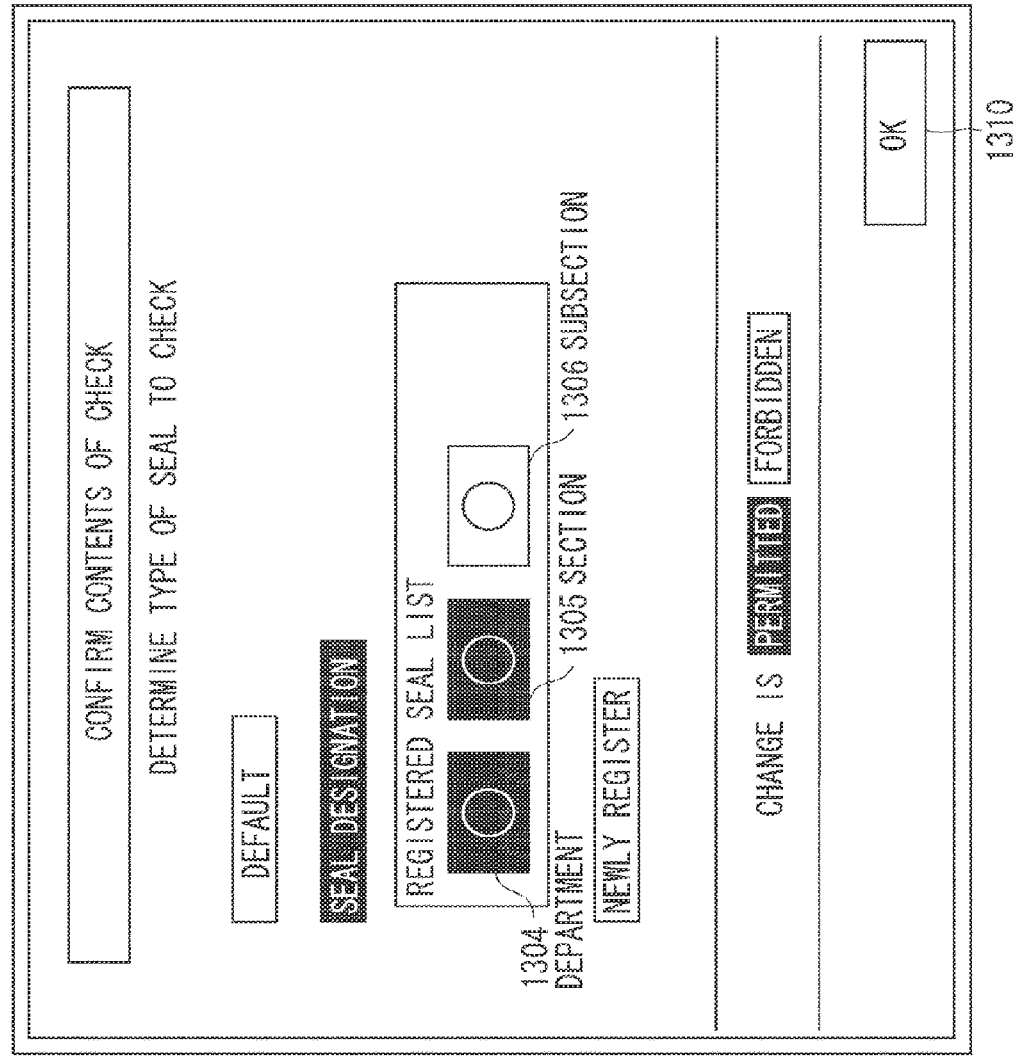
FIG. 13 illustrates an example of a screen for changing setting of regeneration of a scan ticket.

Next, in step S1202, the CPU 0102 analyzes and recognizes a QR code from the image data input from the scanner 0106. The following information is analysis information in a case of using the divided ticket 1006.
Analysis Information
Ticket Name (Identifier): Seal Type
Seal Designation Department Manger's Seal+Section Chief's Seal
Permission/Rejection of Change: Permission Then, in step S1203, the CPU 0102 causes the operation unit 0107 to display results of analysis and recognition performed in step S1202. FIG. 13 illustrates an example of display in the operation unit 0107 when the divided ticket 1006 is used. In the divided thicket 1006, only the type of the seal to be checked is described. Thus, as illustrated in FIG. 13, a screen for confirming and changing the type of the seal is displayed.

Next, in step S1204, it is determined whether the contents of the check described on the scan ticket can be changed. In the divided ticket 1006, change in the contents of the check is permitted using a change permission setting button 0909 (Yes in step S1204). Thus, in this case, the processing proceeds to step S1205. On the other hand, if the change in the contents of the check is forbidden by a change forbidden setting button 0910 (No in step S1204), it is determined that the scan ticket cannot be regenerated. Accordingly, the entire processing is ended.

In step S1205, the CPU 0102 waits for the user to determine whether the contents of the check are changed from the contents displayed in step S1203. If the contents of the check are changed (Yes in step S1205), the processing proceeds to step S1206. In a case illustrated in FIG. 13, it can be understood that the department manager's seal 1304 and the section chief's seal 1305 are set. If the registered seals are changed only to a subsection head's seal, the selection of the department manager's seal 1304 and the section chief's seal 1305 is canceled. Further, a subsection head's seal 1306 is newly selected. Then, such a change in the contents of the check is determined by pushing down the OK button 1310.

Figure 14:
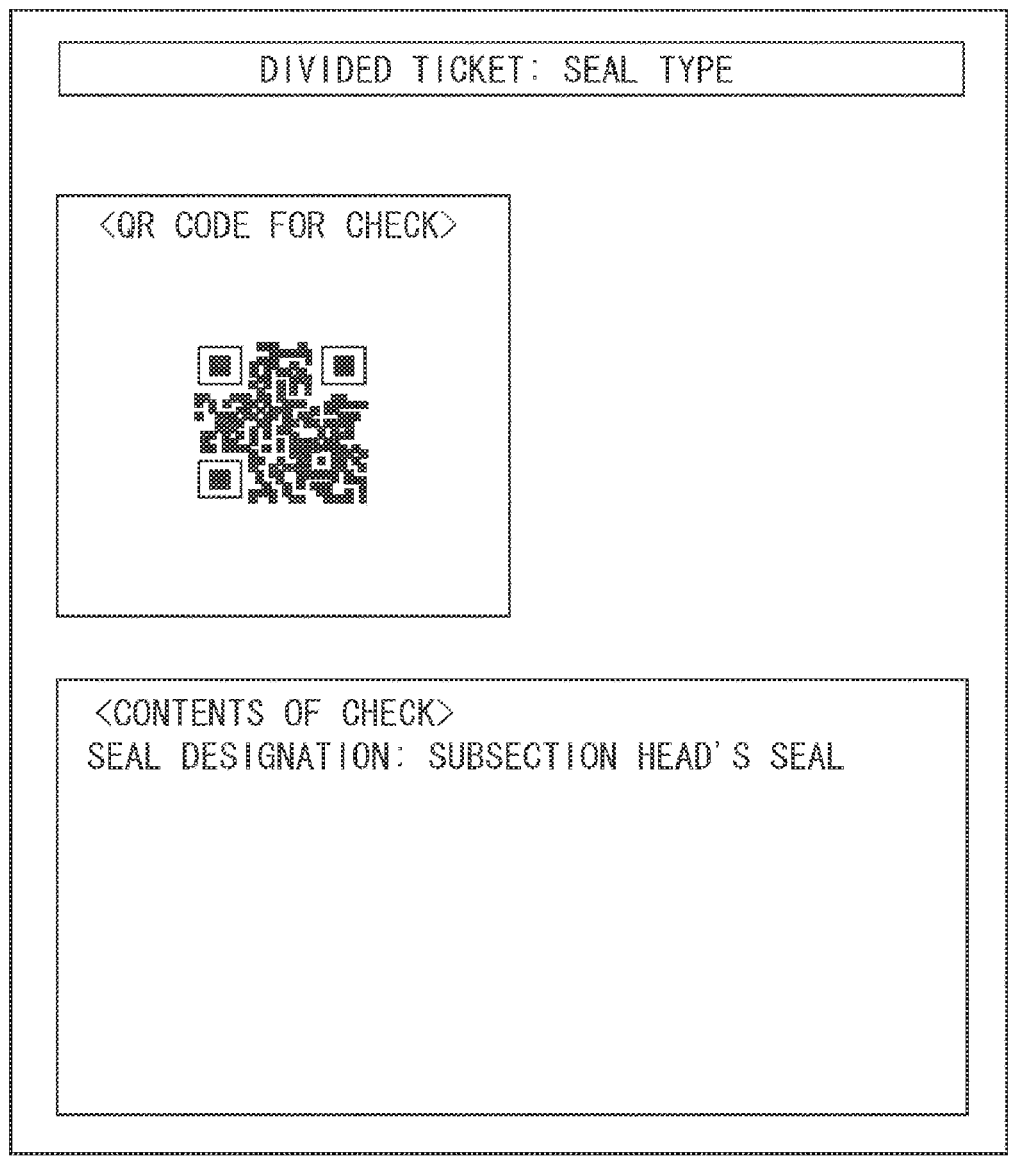
FIG. 14 illustrates an example of an output result of a regenerated scan ticket.

When the change in the contents of the check is determined, the processing proceeds to step S1207 in which encoding is performed according to the contents of the change. More specifically, the CPU 0102 encodes the contents of the check which are changed in the seal designation in the divided ticket 1006 from "the department manager's seal+ the section chief's seal" to only "the subsection head's seal".
Analysis Information after Change
Ticket Name (Identifier): Seal Type
Seal Designation Section Chief's Seal
Permission/Rejection of Change: Permission Finally, in step S1208, the CPU 0102 causes the printer 0105 to output onto the recording paper the encoded contents which are generated in step S1207, as an image. Thus, the printer 0105 prints the image on the recording paper. This image is a changed ticket in which the changed contents of the check are reflected. FIG. 14 illustrates an example of a printed changed ticket. In the changed ticket, the seals designated in the divided ticket 1006 illustrated in FIG. 10 are changed to the subsection head's seal.

Thus, according to the present exemplary embodiment, a user can set new contents of the check by regenerating only a scan ticket to be changed from the scan ticket once generated (a common ticket and a divided ticket).

Contents of the check, such as a type of a seal and a date to be checked, which can be used in any processing instruction sheets, are generated as a divided ticket. Thus, the contents of the check can easily be changed by replacing or repeatedly using the divided ticket. More specifically, a divided ticket is preliminarily and once generated corresponding to a seal to be used in each department in which a check is performed. Accordingly, the contents of the check can easily be changed using the divided ticket repeatedly.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-295441 filed Dec. 25, 2009, which is hereby incorporated by reference herein in its entirety.

What is claimed is:

1. An image processing apparatus which reads a first ticket and a second ticket and performs processing extracted from information added to the tickets, the image processing apparatus comprising:
a ticket generation unit configured to extract, from a processing instruction sheet serving as an original document which describes a processing target region in a processing target original document, information regarding the processing target region in order to generate a ticket, and to generate a ticket to which an encoded image obtained by encoding the extracted information and contents of processing to be performed on the processing target region in a format recognizable by the image processing apparatus is added,
wherein the ticket generation unit further extracts information regarding contents of processing instructed to be performed on a region in which a change in contents of processing instructed by the processing instruction sheet to be performed thereon is not permitted, and generates the first ticket to which the image obtained by encoding the extracted information in the format recognizable by the image processing apparatus is added,
wherein the ticket generation unit extracts information regarding contents of processing instructed to be performed on a region in which a change in contents of processing instructed by the processing instruction sheet to be performed thereon is permitted, and generates the second ticket to which the image obtained by encoding the extracted information in the format recognizable by the image processing apparatus is added, and
wherein the first ticket corresponds to content of the processing target original document to which division is not designated and the second ticket corresponds to content of the processing target original document to which division is designated.

2. The image processing apparatus according to claim 1, wherein when the contents of processing included in the second ticket are changed, a third ticket configured to change contents of an instruction included in the second ticket is generated, and
wherein processing instructed to be performed on the processing target original document is started by reading the first ticket and the third ticket.

3. The image processing apparatus according to claim 1, further comprising a determination unit configured to determine, when the first ticket is scanned, processing by designating an insufficient instruction from an operation unit instead of the second ticket.

4. A method for controlling an image processing apparatus which reads a first ticket and a second ticket and performs processing extracted from information added to the tickets, the method comprising:
extracting, from a processing instruction sheet serving as an original document which describes a processing target region in a processing target original document, information regarding the processing target region in order to generate a ticket, and generating a ticket to which an image obtained by encoding the extracted information and contents of processing to be performed on the processing target region in a format recognizable by the image processing apparatus is added;
extracting information regarding contents of processing instructed to be performed on a region in which a change in contents of processing instructed by the processing instruction sheet to be performed thereon is not permitted, and generating the first ticket to which the image obtained by encoding the extracted information in the format recognizable by the image processing apparatus is added; and
extracting information regarding contents of processing instructed to be performed on a region in which a change in contents of processing instructed by the processing instruction sheet to be performed thereon is permitted, and generating the second ticket to which the image obtained by encoding the extracted information in the format recognizable by the image processing apparatus is added,
wherein the first ticket corresponds to content of the processing target original document to which division is not designated and the second ticket corresponds to content of the processing target original document to which division is designated.

5. The method according to claim 4 further comprising generating, when the contents of processing included in the second ticket are changed, a third ticket configured to change contents of an instruction included in the second ticket, and starting processing instructed to be performed on the processing target original document by reading the first ticket and the third ticket.

6. The method according to claim 4, further comprising determining, when the first ticket is scanned, processing by designating an insufficient instruction from an operation unit instead of the second ticket.

7. A non-transitory computer-readable storage medium storing a computer-executable process, the computer-executable process causing a computer to execute a method for controlling an image processing apparatus which reads a first ticket and a second ticket and performs processing extracted from information added to the tickets, the method comprising:
extracting, from a processing instruction sheet serving as an original document which describes a processing target region in a processing target original document, information regarding the processing target region in order to generate a ticket, and generating a ticket to which an image obtained by encoding the extracted information and contents of processing to be performed on the processing target region in a format recognizable by the image processing apparatus is added;
extracting information regarding contents of processing instructed to be performed on a region in which a change in contents of processing instructed by the processing instruction sheet to be performed thereon is not permitted, and generating the first ticket to which the image obtained by encoding the extracted information in the format recognizable by the image processing apparatus is added; and
extracting information regarding contents of processing instructed to be performed on a region in which a change in contents of processing instructed by the processing instruction sheet to be performed thereon is permitted, and generating the second ticket to which the image obtained by encoding the extracted information in the format recognizable by the image processing apparatus is added,
wherein the first ticket corresponds to content of the processing target original document to which division is not designated and the second ticket corresponds to content of the processing target original document to which division is designated.

8. The non-transitory computer-readable storage medium according to claim 7, wherein the method further comprises generating, when the contents of processing included in the second ticket are changed, a third ticket configured to change contents of an instruction included in the second ticket, and starting processing instructed to be performed on the processing target original document by reading the first ticket and the third ticket.

9. The non-transitory computer-readable storage medium according to claim 7, wherein the method further comprises determining, when the first ticket is scanned, processing by designating an insufficient instruction from an operation unit instead of the second ticket.

* * * * *